US010031713B2

(12) United States Patent
Martin (10) Patent No.: US 10,031,713 B2
(45) Date of Patent: Jul. 24, 2018

(54) METHOD AND A SYSTEM FOR DISPLAYING PRODUCT INFORMATION ON ELECTRONIC LABELS (71) Applicant: SES-imagotag, Nanterre (FR)

(72) Inventor: Yves Martin, Paris (FR)

(73) Assignee: SES-imagotag (FR)

(*) Notice: Subject to any disclaimer, the term of this patent is extended or adjusted under 35 U.S.C. 154(b) by 200 days.

(21) Appl. No.: 14/619,535

(22) Filed: Feb. 11, 2015

(65) Prior Publication Data
US 2015/0179145 A1 Jun. 25, 2015

Related U.S. Application Data (63) Continuation of application No. 14/358,943, filed as application No. PCT/IB2011/003111 on Nov. 18, 2011.

(51) Int. Cl.
G06F 3/147 (2006.01)
G09G 5/22 (2006.01)

(52) U.S. Cl.
CPC ............. G06F 3/147 (2013.01); G09G 5/227 (2013.01); G09G 2330/022 (2013.01); G09G 2340/14 (2013.01); G09G 2370/022 (2013.01); G09G 2380/04 (2013.01)

(58) Field of Classification Search
None
See application file for complete search history.

(56) References Cited

U.S. PATENT DOCUMENTS 5,416,898 A * 5/1995 Opstad .................. G06F 17/214
345/468
7,005,962 B2 * 2/2006 Sundqvist ............ G06Q 20/201
235/383
(Continued)

FOREIGN PATENT DOCUMENTS

WO 03073261 A1 9/2003

OTHER PUBLICATIONS

"Embedded LCD-Display 240×128 With Intelligence", Dec. 31, 2010 (Dec. 31, 2010), XP55027900, Gilching, Germany Retrieved from the Internet: URL: <http://www.mmselectronics.co.uk/edip240-7e.pdf>.
(Continued)

Primary Examiner — Michael J Cobb
(74) Attorney, Agent, or Firm — Lerner, David, Littenberg, Krumholz & Mentlik, LLP (57) ABSTRACT A method for displaying product information on at least one electronic label having a graphic display and a data reception unit is disclosed. The method includes: generating, at a server connected to the label, an individual glyph corresponding to each different character or symbol of the product information; generating at least a display script comprising reference and position data of said glyphs in the product information; transmitting the display script to the label; broadcasting the individual glyphs; selecting and loading in the label individual glyphs corresponding to the reference data comprised in the display script and displaying the selected and loaded individual glyphs according to the position data comprised in the display script. A server, an electronic label and a sever thereof are also provided.

10 Claims, 5 Drawing Sheets (56) References Cited

U.S. PATENT DOCUMENTS

| | | | |
|---|---|---|---|
| 7,064,757 B1* | 6/2006 | Opstad | G06F 17/214 |
| | | | 345/467 |
| 7,155,672 B1 | 12/2006 | Adler et al. | |
| 9,268,977 B2* | 2/2016 | Karhuketo | G06K 7/0008 |
| 2001/0008564 A1* | 7/2001 | Hirao | H04N 1/4115 |
| | | | 382/253 |
| 2002/0118885 A1* | 8/2002 | Smeets | H03M 7/30 |
| | | | 382/246 |
| 2005/0151701 A1 | 7/2005 | Rosander et al. | |
| 2008/0030502 A1* | 2/2008 | Chapman | G06K 15/02 |
| | | | 345/472.3 |
| 2009/0243873 A1* | 10/2009 | Mizukawa | G06F 3/147 |
| | | | 340/4.32 |
| 2010/0106588 A1 | 4/2010 | Jones et al. | |
| 2011/0175732 A1* | 7/2011 | Hakata | G06Q 30/06 |
| | | | 340/540 |

OTHER PUBLICATIONS

International Search Report for Application No. PCT/IB2011/003111 dated Jun. 22, 2012.

\* cited by examiner

```
                        MOVE_ABS 185 70      MOVE_REL -1 0        PLACE_GLYPH 30
                        PLACE_GLYPH 19       PLACE_GLYPH 40       MOVE_REL -1 0
                        MOVE_REL -1 3        MOVE_REL -1 0        PLACE_GLYPH 29
                        PLACE_GLYPH 20       PLACE_GLYPH 14       PLACE_GLYPH 29
MOVE_ABS 2 1            MOVE_REL -1 -6       MOVE_REL -1 0        MOVE_REL -24 15
PLACE_GLYPH 136         PLACE_GLYPH 121      PLACE_GLYPH 41       PLACE_GLYPH 30
PLACE_GLYPH 137         MOVE_REL -1 0        MOVE_REL -58 15      MOVE_REL -2 0
MOVE_REL -1 0           PLACE_GLYPH 146      PLACE_GLYPH 41       PLACE_GLYPH 32
PLACE_GLYPH 138         MOVE_REL 0 15        MOVE_REL -1 0        MOVE_REL 0 7
PLACE_GLYPH 139         PLACE_GLYPH 22       PLACE_GLYPH 42       PLACE_GLYPH 33
PLACE_GLYPH 140         MOVE_REL 0 -15       PLACE_GLYPH 11       MOVE_REL -3 -7
MOVE_REL -1 0           PLACE_GLYPH 99       MOVE_REL 2 0         PLACE_GLYPH 34
PLACE_GLYPH 141         MOVE_REL -1 0        PLACE_GLYPH 41       MOVE_REL -1 0
PLACE_GLYPH 142         PLACE_GLYPH 99       MOVE_REL -1 0        PLACE_GLYPH 30
PLACE_GLYPH 143         MOVE_ABS 199 87      PLACE_GLYPH 42       MOVE_REL -3 7
PLACE_GLYPH 144         PLACE_GLYPH 10       PLACE_GLYPH 13       PLACE_GLYPH 33
PLACE_GLYPH 145         PLACE_GLYPH 11       MOVE_REL -59 15      MOVE_REL 0 -7
PLACE_GLYPH 143         MOVE_REL 0 10        PLACE_GLYPH 43       PLACE_GLYPH 29
MOVE_REL 40 0           PLACE_GLYPH 12       PLACE_GLYPH 44       PLACE_GLYPH
PLACE_GLYPH 121         MOVE_REL -1 -10      MOVE_REL -2 0
PLACE_GLYPH 127         PLACE_GLYPH 13       PLACE_GLYPH 41
PLACE_GLYPH 127         MOVE_REL -3 0        MOVE_REL 2 0
PLACE_GLYPH 127         PLACE_GLYPH 14       PLACE_GLYPH 41
MOVE_REL 3 0            MOVE_ABS 68 101      MOVE_REL -1 0
PLACE_GLYPH 144         PLACE_GLYPH 48       PLACE_GLYPH 42
                        PLACE_GLYPH 52       PLACE_GLYPH 13
                        PLACE_GLYPH 50       MOVE_REL -64 15
                        PLACE_GLYPH 54       PLACE_GLYPH 11
                        PLACE_GLYPH 128      MOVE_REL -1 0
                        PLACE_GLYPH 92       PLACE_GLYPH 45
                        PLACE_GLYPH 50       MOVE_REL 3 0
                        PLACE_GLYPH 128      PLACE_GLYPH 46
                        PLACE_GLYPH 53       MOVE_REL -1 0
                        PLACE_GLYPH 48       PLACE_GLYPH 37
                        PLACE_GLYPH 51       MOVE_REL -4 0
                        PLACE_GLYPH 50       PLACE_GLYPH 42
                        PLACE_GLYPH 53       PLACE_GLYPH 47
                        MOVE_ABS 41 31       MOVE_ABS 111 31
                        PLACE_GLYPH 36       PLACE_GLYPH 29
                        MOVE_REL -2 0        MOVE_REL -8 15
                        PLACE_GLYPH 37       PLACE_GLYPH 30
                        MOVE_REL -2 0        MOVE_REL -1 0
                        PLACE_GLYPH 38       PLACE_GLYPH 31
                        PLACE_GLYPH 39       MOVE_REL -17 15
                                             35
```

FRILANDSG#S
FACINGS 0
STR STK 25
5000 WHS STK 200
G RO DATE 24-12-09     kr57.99
                        PR.KG

METHOD AND A SYSTEM FOR DISPLAYING PRODUCT INFORMATION ON ELECTRONIC LABELS

CROSS REFERENCE TO RELATED APPLICATIONS

The present application is a continuation application of U.S. application Ser. No. 14/358,943 filed on May 16, 2014, which is a national phase entry under 35 U.S.C. § 371 of International Application No. PCT/IB2011/003111, filed on Nov. 18, 2011, the disclosures of which are incorporated by reference herein.

FIELD OF THE INVENTION

The field of this invention is that of electronic shelf labels.

More precisely, the invention relates to a low-bandwidth method for transmitting and displaying product information on such labels.

BACKGROUND OF THE INVENTION

Electronic shelf labels are beginning replacing paper shelf labels in supermarkets. For each product placed on a shelf, a modern electronic label can display both information for consumers (price, unit price, promotion . . . ) and information for employees of the store (inventory, facing, barcode . . . ).

Generally, electronic labels are wirelessly connected to a main server located somewhere in the store, in which data about all products is managed. This server is traditionally connected to the store back office, in order to be gather all information required to display on the ESL. Several radio technologies are commonly used, including WiFi, radio waves or infrared transmission.

The information displayed by the labels is regularly updated. Prices may evolve, configuration of shelves may change. To this end, protocols of transmission are used to send messages from the server to the targeted labels.

Existing protocols generally meet all the expectations for supermarkets and hypermarkets in which the electronic shelf labels use Segmented Display technology. However when graphic display technology, i.e. a 2-dimensional array of lit or unlit pixels (also named "DotMatrix Display" technology) is used, existing protocols require some advanced compression techniques to meet customer expectations in terms of throughput and ESL update rate.

The number of electronic labels commonly reach tens of thousands in hypermarkets. At this scale, bandwidth and throughput can become bottlenecks. The amount of data to be sent at each update may indeed overpass wireless capability. Gaps of several minutes may then appear between the launching of an update by the server and the effective display update of the labels, which could mislead customers and generate errors, if shifts occur between displayed prices and real prices.

Moreover, electronic shelf labels are commonly battery powered and each data transmission draws energy. As electronic labels only comprise a small embedded battery whose lifetime is long but limited, the increase of the amount of data to be transferred directly shorten the life expectancy of labels.

These problems will still increase in coming years, as new labels are expected, these labels being provided with large high-resolution LCD screens, or even with color displays.

A first solution to this problem is to directly send raw data to the labels. These data are less voluminous, but have to be processed by the label itself for being displayed. It requires complex labels comprising an improved treatment unit, and possibly a memory. These labels are more expensive, and above all consume more energy, which is not acceptable as electronic labels only comprise an embedded small battery whose lifetime is long but limited.

International patent application WO03/073261 proposes a method for lowering the energy consumption when updating the display with new product information. The idea is to update only the part of the display which has to be updated. Messages are sent in coded text, and displays are derived from this text and from fonts stored in each label.

However, if this method reduces the problem, it does not solve it. Indeed, the needed bandwidth remains proportional to the number of labels in the supermarket. Besides, labels require enough memory for storing every font of the store in every size.

SUMMARY OF THE INVENTION

The aim of the present invention is to provide a new data transmission protocol for displaying product information on electronic labels with Graphic Display technology which would remain very efficient whatever the number of labels. Preferably, such a method should not increase or even decrease the power consumption of labels. Finally, as internal memory in labels is expensive, such protocol should not require any outside memory for local storage.

According to a first aspect, the present invention provides a method for displaying product information on at least one electronic label having a graphic display and a data reception unit, characterized in that it comprises the steps of:

(a) generating, at a server connected to the label, an individual glyph corresponding to each different character or symbol of the product information;

(b) generating at least a display script comprising reference and position data of said glyphs in the product information;

(c) transmitting the display script to the label;

(d) broadcasting the individual glyphs;

(e) selecting and loading in the label individual glyphs corresponding to the reference data comprised in the display script; and (f) displaying the selected and loaded individual glyphs according to the position data comprised in the display script.

Each glyph is a bitmap representing a character or a symbol. The interest of this method is that each glyph has only to be sent once for the whole store. Thus, for one single label, about fifty glyphs are generally needed. In this case, the method according to the invention would not be very efficient, as one glyph would have to be sent for nearly each character of this label. But a store with only one label is a nonsense. And if there are many labels, statistically some characters will be common. For example, in a European store the symbol € should be found in every label.

With ten labels, about a hundred of glyphs are needed. With 10000 labels, only a couple of hundreds of glyphs are needed. The number of glyphs to be sent is not proportional to the number of label.

This kind of system is referred as an asymmetrical connected system, in which only one central processing system sends information to a large number of end devices.

In existing communication schemes, whether wireless or wired, the asymmetrical topology of the network is not leveraged from a data compression perspective. The traditional communication methods therefore imply sending an amount of information that is directly proportional with the number of communication devices addressed. The method described here enables to the contrary a highly non-linear communication scheme that achieves a very efficient compression ratio for asymmetrical communications.

Figure 1:
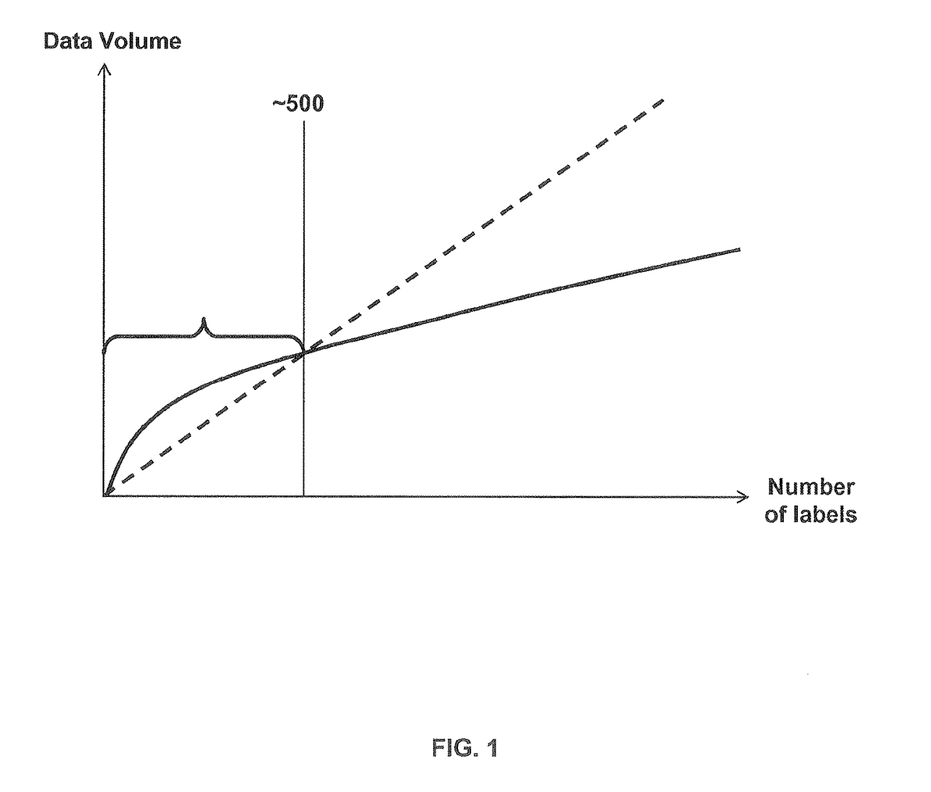
FIG. 1 previously described is a graph comparing between a known method using coded text messages and the method according to the invention the data volume to be transmitted as a function of the number of electronic labels.

A graph comparing between a method using coded text messages (dotted line) and the method according to the invention (continuous line) the data volume to be transmitted as a function of the number of electronic labels is thus represented by FIG. 1. As already explained, the method according to the invention is very efficient when the number of labels is high. By considering that the average weight of a glyph is 300 bits, the method according to the invention becomes better than any other known method from about 500 labels, i.e. a tiny supermarket.

Besides, as glyphs are images, they can be used for every alphabet, in particular Asian alphabets.

In addition, each glyph can further be compressed by applying a known compression method. The known compression method shall be implemented inside the communication device (ESL) in order to be decompressed locally.

Preferred but non limiting features of the present invention are as follow:
  the display script further comprises kerning data of the glyphs in the product information;
  a plurality of display scripts is generated at step (b), each display script corresponding to a part of the product information;
  a plurality of labels is simultaneously involved, each label displaying a specific product information;
  the data reception unit of the label is in a standby mode except during steps (c) and (d);
  step (c) is implemented following a previous step of (c1) broadcasting a wakeup message for ending standby mode; and a step of (d2) broadcasting a sleep message for going into standby mode is implemented following step (d);
  step (d) is implemented following a previous step of (d1) broadcasting a synchronization message;
  display scripts which are common to a plurality of labels are multicast at step (c);
  step (c) is implemented following a previous step of (c2) transmitting a Preamble to the label, said preamble comprising reference data of glyphs to be selected during the step (e); and glyphs are broadcast with their reference data at step (d);
  reference data of glyphs are coded in the preambles according to a Huffman algorithm.

The present invention further provides according to a second aspect a server comprising:
  a glyph unit configured for generating for each different character or symbol of a product information an individual glyph;
  a script generator unit configured for generating at least a display script comprising reference and position data of said glyphs in the product information to be displayed in at least one electronic label;
  a data emitting unit configured for transmitting the glyphs and the at least one display script to at least one electronic label.

The present invention further provides according to a third aspect an electronic label comprising a graphic display, a processing unit, a memory, a data reception unit, characterized in that:
  the data reception unit is configured to receive and load into the memory at least one display script comprising reference and position data of glyphs corresponding to the characters and symbols in a product information to be displayed;
  the data reception unit is further configured to receive a sequence of glyphs with their reference data;
  the processing unit is configured to determine, for each glyph if its reference data corresponds to one of the reference data loaded in the memory, and to select the glyph and load it into the memory if it is the case;
  the processing unit is further configured to order the displaying by the graphic display of the selected and loaded individual glyphs according to the position data of the display script.

The present invention further provides according to a fourth aspect a system comprising a server according to the second aspect of the invention, and at least one electronic label according to the third aspect of the invention.

BRIEF DESCRIPTION OF THE DRAWINGS

The above and other objects, features and advantages of this invention will be apparent in the following detailed description of an illustrative embodiment thereof, with is to be read in connection with the accompanying drawings wherein.

DETAILED DESCRIPTION OF A PREFERRED EMBODIMENT

Referring to the drawings, a method according to the invention will now be described.

The method according to this invention comprises two parts. During the first part, product information to be displayed is processed by a server, and during the second part, which is actually represented in FIG. 2, said processed information product is transmitted to an electronic shelf on which it is to be displayed.

Generally, the server is a computer located in the store. On this computer, products are managed thanks to databases. Thus there are generally two components of the product information: consumer data, and management data.

Consumer data constitute a large majority of the total data amount, but only a small part of the daily transferred data. They comprise price data and other data which are directly related to the product (mass, composition, brand . . . ), etc. These data hardly ever changes, except sometimes the price. A modification of such data is often manually done on the database, and immediately implies a transmission from the server to labels displaying product information related to this data.

Management data change everyday. These data are essential to manage the store, but are generally not visible for the consumer. For example, they comprise stock information, barcode. Such data are updated every morning on the labels. Because of this daily transmission, the management data constitute the largest part of the transferred data amount.

First Part: Processing of the Product Information by the Server

The first step of the method according to the invention is the processing of the product information to be transmitted. Indeed, on the server, this information is a String, for example the word "Grape", associated with a font, for example Arial 12. A program of the server, called the glyph unit, recognizes each character or symbol of the product information and separates them. For each character or symbol, a glyph is generated. To this end, the glyph may be directly drawn by a dedicated program. Else, there may be a table in the memory of the server, said table associating for each individual character the corresponding glyph. For a given character, there is a glyph per font.

Figure 3:
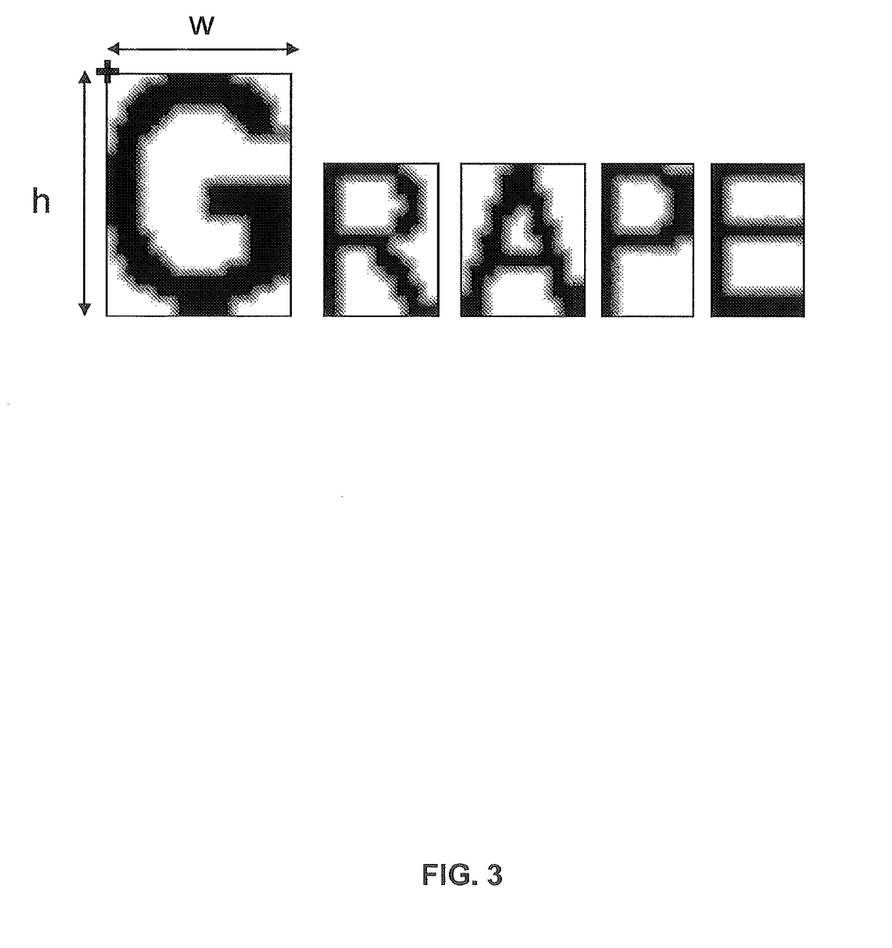
FIG. 3 is an example of a generation of glyphs associated with a product name.

For our example, five glyphs are generated, as it can be seen in FIG. 3.

During a second step, a script coding reference and position data of the glyph is generated: the display script. The invention is not limited to a particular syntax of the display script. In the described preferred embodiment, the width w and the height h of every glyph are known. Thanks to these parameters and to the text of the product information, the position of each glyph (defined by the coordinates of its left upper corner) is calculated. In the case of the word "Grape", "G" is a capital letter. Its corresponding glyph has to be shifted to the up with respect to the other glyphs (see FIG. 3).

Advantageously, the display script further comprises kerning data. The kerning is the process of adjusting spacing between consecutive characters. In a well-kerned font, the two-dimensional blank spaces between each pair of letters all have similar area. For example, in the case of the pair of letters "VA", the two glyphs are slightly overlaying. Moreover, kerning enables ligatures (ex: "encyclopaedia"). Besides, it enables a better integration of a plurality of languages.

Figure 4:
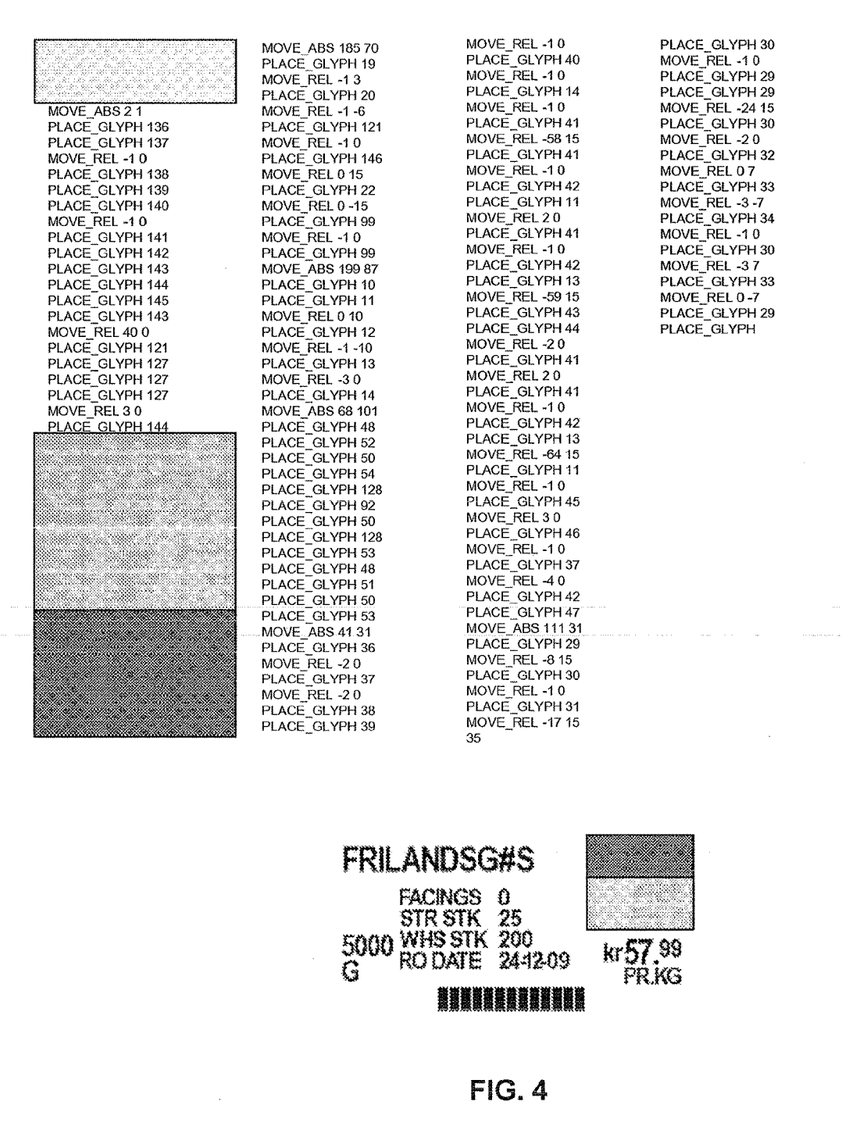
FIG. 4 is an example of a display script coding position data of glyphs.

When the position of every glyph in the information to be displayed is known, the corresponding display script is generated. An example of display script, and its corresponding product information is represented in FIG. 4. Three blocks of instructions have been highlighted. The first block enables initialization of graphic parameters of the display. The two others code a part of the product information.

For example, the weight "5000 G" is coded by:

| | |
|---|---|
| MOVE_ABS 1 64 | //positioning of the left upper corner |
| PLACE_GLYPH 16 | //5 |
| MOVE_REL -1 0 | //kerning between 5 and 0 |
| PLACE_GLYPH 17 | //0 |
| PLACE_GLYPH 17 | //0 |
| PLACE_GLYPH 17 | //0 |
| MOVE_REL -36 18 | //space between 0 and G |
| PLACE_GLYPH 18 | //G |

In this example, one display script is coding the whole product information to be displayed on a label, one such script is generated for each label. However, some parts of a product information are often common to a plurality of labels. In the example represented in FIG. 4, we can see "FACINGS", "STR STK" (storage stocks) or "PR.KG" (Price per kilogram). These fields are common to all labels.

Advantageously, such recurrent parts of the product information are coded by a specific display which is sent once, instead of being sent as a part of each display script.

To reduce the bandwidth as much as possible, the product information is divided into a plurality of display script, each of them being shared with the maximum of labels.

Figure 5:
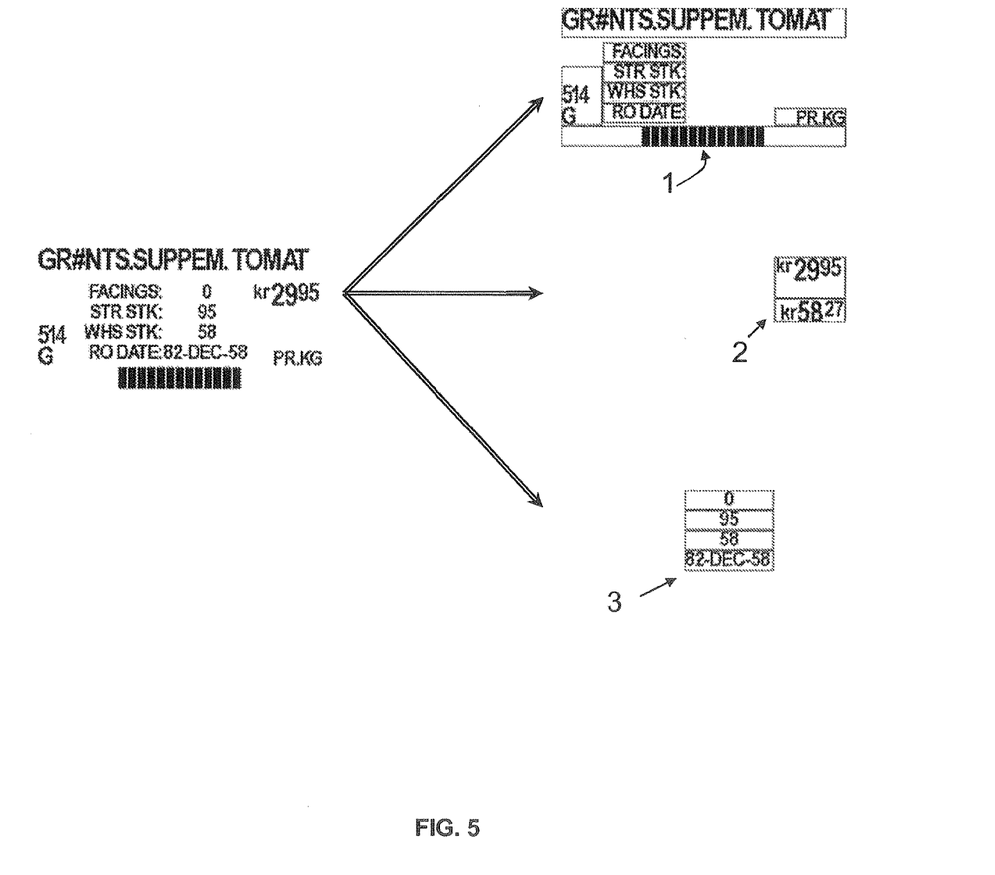
FIG. 5 is an example of a product information parsed into different display scripts.

An example of such a division is represented in FIG. 5. Each block may generate a separate display script. This plurality of display scripts is here organized into three groups, a first group 1 related to background data, a second group 2 related to price data, and a third group 3 related to management data. The background data are data which never change. The price data are the data which occasionally change. The management data change everyday as already explained. Such architecture is very flexible, and keeps needs in bandwidth very low.

Second Part: Transmission of the Processed Product Information

The at least one display script and the glyphs are then sent from the server to the labels.

The labels can be connected to the server by any mean known by a man skilled in the art. For example, the server may be linked to ceiling antenna streamers, which will send radio waves to each label of the store. Else, a plurality of Infra Red emitter can be used. In combination with these transmission systems, each label comprises a data reception unit. This unit is adapted for receiving signals and making them understandable by the label.

Three kinds of message transmissions are used in the method according to the invention: broadcast (every label receives the message), unicast (only one label receives the message) and multicast (a group of labels receives the message).

Preferably, to reduce the energy consumption, the data reception units of the labels are off when no data is transmitted. This state of the label is called the standby mode. So in the advantageous embodiment described, the transmission protocol starts with a wakeup message. This wake up message is broadcast, and makes every label to switch its data reception unit on. However, the invention is not limited to an embodiment in which the labels are waken up and then shut off at each data transmission.

In a first embodiment, display scripts are then directly sent to the labels. For each display script received, the list of indexes of glyphs to be retrieved is established by the label. This is the key point of the method according to the invention: each glyph has only to be sent once for the entire store. As the number of glyphs is not proportional to the number of labels but increases logarithmically, there is no more a maximum number of labels to be supported.

Figure 2:
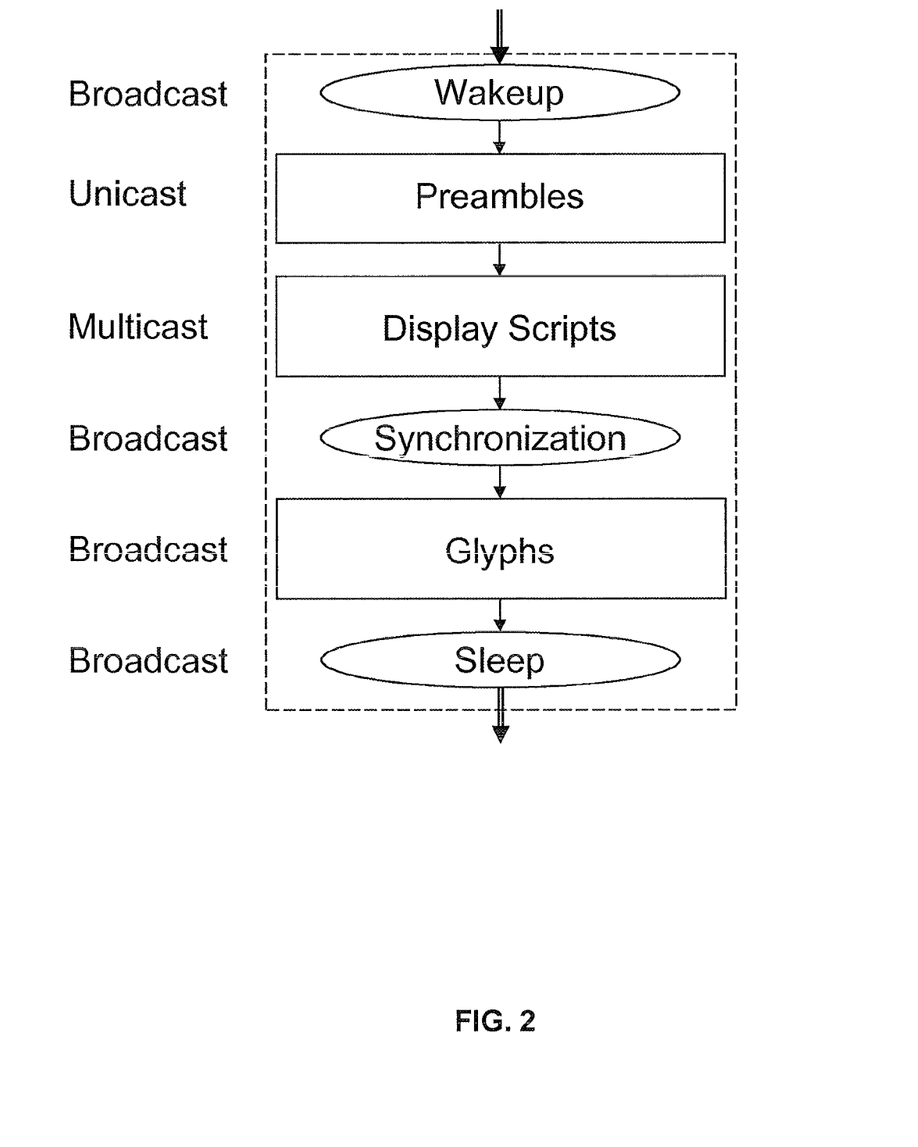
FIG. 2 is a diagram representing a part of the method according to a possible embodiment of the invention.

Thanks to a second embodiment, corresponding to the diagram of FIG. 2, it is possible to further improve the efficiency of such method by reducing the number of different display script messages to be sent. Thus, in some case, redundant data may be sent. For example, there could be a first product information "STRAWBERRY" and a second one "BLACKBERRY". It can be assumed that these product information present similarities: both will be displayed at the same location on their label, with the same font and the same size. And as a display script has to be written per information, time and header data volume of the second message to be sent will be wasted.

The solution is to build only one display script "??????????" and to send separately the missing data in messages called preambles, such messages only containing lists of indexes of glyphs to be used for filling the blanks. In our example, the first preamble would contain the sequence [S, T, R, A, W, B, E, R, R, Y] and the second [B, L, A, C, K, B, E, R, R, Y].

In this embodiment, preambles (which are inherent to only one label) are unicast. Display scripts, which can now be shared between labels once products information present similitaries, are then multicast. However, the invention is not limited to a method using preambles, only display scripts are required.

Preambles may be used even more advantageously for still reducing redundant data. In our example, it could be noticed that the common part "BERRY" will be coded twice. The solution is to build a display script "?????BERRY" and to send lighter preambles comprising only the missing data (i.e. only lists of indexes of unshared glyphs). The first preamble would thus contain the sequence [S, T, R, A, W] and the second [B, L, A, C, K].

Before beginning to send the glyphs, a synchronization message is advantageously broadcast to indicate the labels that the glyphs are ready to be sent. Indeed, preambles and display scripts are sent consecutively, and queued by each label they are addressed to. Consequently, they sometimes need a few seconds to process these messages. The synchronization guarantees that no label will miss a glyph because of a lag. Such message is also not compulsory.

Glyphs are then sent one by one. They are multicast, or even broadcast. Glyph messages are voluminous, because each glyph is a bitmap. Such glyph message begins with the index of the following glyph. The glyph itself is then coded, line by line. A 16×8 glyph, without compression but with interlaced lines has a typical weight of nearly 0.2 kb.

With respect to preambles and display scripts, each label selects and downloads each glyph required. Other glyphs are ignored.

When the last glyph has been sent, advantageously a sleep message is broadcast. This message commands the label to shut off their data reception unit until the next transmission.

HELLO WORLD Example

In this example, product information HELLO WORLD and WORLD HELLO are to be respectively displayed on two labels, following a method according to the invention.

We assume that the pre-processing part has already been performed by the server. The display script is written and each glyph is generated:

| Glyph | Hexadecimal index |
|---|---|
| H | 100 |
| E | 101 |
| L | 102 |
| O | 103 |
| ' ' (Space) | 104 |
| W | 105 |
| R | 106 |
| D | 107 |

The first message to be sent is the "wakeup" message. This message is broadcast and announces that preambles and display scripts are following.

| Quartet number | Data | Comments |
|---|---|---|
| 5 | DFFFF | Broadcast adress |
| 6 | 1 | Preamble/Display script mode (wakeup) |
| 7 | 0 | Padding |
| 8 | | CRC4 |

A quartet is a group of 4 bits (2 quartets make an octet). Each quartet corresponds to a hexadecimal character. The "padding" consists in adding meaningless bits at the end of the message to have a number of quartet which is multiple of 4 (i.e. a number of bits which is multiple of 16), to have a structure by blocks. CRC4 means Cyclic Redundancy Check 4-bits. This is a checksum aiming to detect transmission errors.

The awaken labels are then waiting for preambles/display scripts. The two alternative embodiment previously described will be compared.

Strategy with Display scripts only

A display script is required per label. Both are unicast.

Display Script of Label 1

| Quartet number | Data | Comments |
|---|---|---|
| 5 | FFFFE | Label 1 adress |
| 6 | 0 | Display script start code |
| 7 | 0 | VERSION(0); |
| 10 | 191 | FILL_FRAME(1);   //White frame |
| 12 | 80 | USE_PEN(0);   //Black pen |
| 15 | 310 | SET_GLYPH_OFFSET(0x10); |
| 18 | 400 | PLACE_GLYPH(0); //H |
| 21 | 401 | PLACE_GLYPH(1); //E |
| 24 | 402 | PLACE_GLYPH(2); //L |
| 27 | 402 | PLACE_GLYPH(2); //L |
| 30 | 403 | PLACE_GLYPH(3); //O |
| 33 | 404 | PLACE_GLYPH(4); //' ' |
| 36 | 405 | PLACE_GLYPH(5); //W |
| 39 | 403 | PLACE_GLYPH(3); //O |
| 42 | 406 | PLACE_GLYPH(6); //R |
| 45 | 402 | PLACE_GLYPH(2); //L |
| 48 | 407 | PLACE_GLYPH(7); //D |
| 50 | 00 | Display script end code |
| 52 | 00 | Padding |
| 56 | | CRC16 |

Display Script of Label 2

| Quartet number | Data | Comments |
|---|---|---|
| 5 | FFFF1 | Label 2 adress |
| 6 | 0 | Display script start code |
| 7 | 0 | VERSION(0); |
| 10 | 191 | FILL_FRAME(1);   //White frame |
| 12 | 80 | USE_PEN(0);   //Black pen |
| 15 | 310 | SET_GLYPH_OFFSET(0x10); |
| 18 | 405 | PLACE_GLYPH(5); //W |
| 21 | 403 | PLACE_GLYPH(3); //O |
| 24 | 406 | PLACE_GLYPH(6); //R |
| 27 | 402 | PLACE_GLYPH(2); //L |
| 30 | 407 | PLACE_GLYPH(7); //D |
| 33 | 404 | PLACE_GLYPH(4); //' ' |
| 36 | 400 | PLACE_GLYPH(0); //H |
| 39 | 401 | PLACE_GLYPH(1); //E |
| 42 | 402 | PLACE_GLYPH(2); //L |
| 45 | 402 | PLACE_GLYPH(2); //L |
| 48 | 403 | PLACE_GLYPH(3); //O |
| 50 | 00 | Display script end code |
| 52 | 00 | Padding |
| 56 | | CRC16 |

We note that 2×56 quartets are sent during this phase, i.e. ≈450 bits.

Strategy preambles+Display scripts

Preamble of Label 1

| Quartet number | Data | Comments |
|---|---|---|
| 5 | FFFFE | Label 1 adress |
| 6 | 0 | H |
| 7 | 1 | E |

-continued

| Quartet number | Data | Comments |
| --- | --- | --- |
| 8 | 2 | L |
| 9 | 2 | L |
| 10 | 3 | O |
| 11 | 4 | ' ' |
| 12 | 5 | W |
| 13 | 3 | O |
| 14 | 6 | R |
| 15 | 2 | L |
| 16 | 7 | D |
| 19 | 000 | Padding |
| 20 | | CRC4 |

Preamble of Label 2

| Quartet number | Data | Comments |
| --- | --- | --- |
| 5 | FFFF1 | Label 2 adress |
| 6 | 5 | W |
| 7 | 3 | O |
| 8 | 6 | R |
| 9 | 2 | L |
| 10 | 7 | D |
| 11 | 4 | ' ' |
| 12 | 0 | H |
| 13 | 1 | E |
| 14 | 2 | L |
| 15 | 2 | L |
| 16 | 3 | O |
| 19 | 000 | Padding |
| 20 | | CRC4 |

The two labels have received the sequence of the indexes of glyphs which do not share the same place in both labels. Indeed, as there is only one block of data in each product information, the best solution is to multicast a unique display script to reduce to the maximum the data volume to be transferred.

| Quartet number | Data | Comments | |
| --- | --- | --- | --- |
| 5 | DFFFE | Multicast adress | |
| 6 | 0 | Display script start code | |
| 7 | 0 | VERSION(0); | |
| 10 | 191 | FILL_FRAME(1); | //White frame |
| 12 | 80 | USE_PEN(0); | //Black pen |
| 15 | 310 | SET_GLYPH_OFFSET(0x10); | |
| 16 | 5 | PLACE_GLYPH CD( ); //H | W |
| 17 | 5 | PLACE_GLYPH CD( ); //E | O |
| 18 | 5 | PLACE_GLYPH CD( ); //L | R |
| 19 | 5 | PLACE_GLYPH CD( ); //L | L |
| 20 | 5 | PLACE_GLYPH CD( ); //O | D |
| 21 | 5 | PLACE_GLYPH CD( ); //' ' | ' ' |
| 22 | 5 | PLACE_GLYPH CD( ); //W | H |
| 23 | 5 | PLACE_GLYPH CD( ); //O | E |
| 24 | 5 | PLACE_GLYPH CD( ); //R | L |
| 25 | 5 | PLACE_GLYPH CD( ); //L | L |
| 26 | 5 | PLACE_GLYPH CD( ); //D | O |
| 28 | 00 | Display script end code | |
| 32 | | CRC16 | |

Than to the preambles, both "HELLO WORLD" and "WORLD HELLO" can be coded by a unique display script: missing letters are completed thanks to preambles.

With this second strategy, only 20+20+32 quartets are sent during this phase, i.e. ≈280 bits. The data volume is reduced by a third.

Whatever the strategy, labels are now synchronized before launching glyphs transmission.

| Quartet number | Data | Comments |
| --- | --- | --- |
| 5 | DFFFF | Broadcast adress |
| 6 | 2 | Glyph mode (Synchronization) |
| 7 | 0 | Padding |
| 8 | | CRC4 |

Glyphs are then broadcast one by one.

Glyph H

| Quartet number | Data | Comments |
| --- | --- | --- |
| 5 | DE100 | Multicast adress/Glyph index 100 |
| 6 | 2 | Glyph sending |
| 11 | 02008 | Glyph width: 8/Glyph height: 16 |
| 12 | 0 | No compression/Interlacing 1 line |
| 14 | 00 | 0000 0000 |
| 16 | 00 | 0000 0000 |
| 18 | 42 | 0100 0010 |
| 20 | 00 | 0100 0010 |
| 22 | 00 | 0100 0010 |
| 24 | 00 | 0100 0010 |
| 26 | 3B | 0111 1110 |
| 28 | 00 | 0111 1110 |
| 30 | 3B | 0100 0010 |
| 32 | 00 | 0100 0010 |
| 34 | 00 | 0100 0010 |
| 36 | 00 | 0100 0010 |
| 38 | 00 | 0100 0010 |
| 40 | 00 | 0100 0010 |
| 42 | 42 | 0000 0000 |
| 44 | 00 | 0000 0000 |
| 48 | | CRC16 |

Glyph E

| Quartet number | Data | Comments |
| --- | --- | --- |
| 5 | DE101 | Multicast adress/Glyph index 101 |
| 6 | 2 | Glyph sending |
| 11 | 02008 | Glyph width: 8/Glyph height: 16 |
| 12 | 0 | No compression/Interlacing 1 line |
| 14 | 00 | 0000 0000 |
| 16 | 00 | 0000 0000 |
| 18 | 7E | 0111 1110 |
| 20 | 3E | 0100 0000 |
| 22 | 00 | 0100 0000 |
| 24 | 00 | 0100 0000 |
| 26 | 3C | 0111 1100 |
| 28 | 00 | 0111 1100 |
| 30 | 3C | 0100 0000 |
| 32 | 00 | 0100 0000 |
| 34 | 00 | 0100 0000 |
| 36 | 00 | 0100 0000 |
| 38 | 00 | 0100 0000 |
| 40 | 3E | 0111 1110 |
| 42 | 7E | 0000 0000 |
| 44 | 00 | 0000 0000 |
| 48 | | CRC16 |

Glyph L

| Quartet number | Data | Comments |
| --- | --- | --- |
| 5 | DE102 | Multicast adress/Glyph index 102 |
| 6 | 2 | Glyph sending |
| 11 | 02008 | Glyph width: 8/Glyph height: 16 |
| 12 | 0 | No compression/Interlacing 1 line |
| 14 | 00 | 0000 0000 |

-continued

| Quartet number | Data | Comments |
| --- | --- | --- |
| 16 | 00 | 0000 0000 |
| 18 | 40 | 0100 0000 |
| 20 | 00 | 0100 0000 |
| 22 | 00 | 0100 0000 |
| 24 | 00 | 0100 0000 |
| 26 | 00 | 0100 0000 |
| 28 | 00 | 0100 0000 |
| 30 | 00 | 0100 0000 |
| 32 | 00 | 0100 0000 |
| 34 | 00 | 0100 0000 |
| 36 | 00 | 0100 0000 |
| 38 | 00 | 0100 0000 |
| 40 | 3E | 0111 1110 |
| 42 | 7E | 0000 0000 |
| 44 | 00 | 0000 0000 |
| 48 | | CRC16 |

Glyph O

| Quartet number | Data | Comments |
| --- | --- | --- |
| 5 | DE103 | Multicast adress/Glyph index 103 |
| 6 | 2 | Glyph sending |
| 11 | 02008 | Glyph width: 8/Glyph height: 16 |
| 12 | 0 | No compression/Interlacing 1 line |
| 14 | 00 | 0000 0000 |
| 16 | 00 | 0000 0000 |
| 18 | 3C | 0011 1100 |
| 20 | 7E | 0100 0010 |
| 22 | 00 | 0100 0010 |
| 24 | 00 | 0100 0010 |
| 26 | 00 | 0100 0010 |
| 28 | 00 | 0100 0010 |
| 30 | 00 | 0100 0010 |
| 32 | 00 | 0100 0010 |
| 34 | 00 | 0100 0010 |
| 36 | 00 | 0100 0010 |
| 38 | 00 | 0100 0010 |
| 40 | 7E | 0011 1100 |
| 42 | 3C | 0000 0000 |
| 44 | 00 | 0000 0000 |
| 48 | | CRC16 |

Glyph"

| Quartet number | Data | Comments |
| --- | --- | --- |
| 5 | DE104 | Multicast adress/Glyph index 104 |
| 6 | 2 | Glyph sending |
| 11 | 02008 | Glyph width: 8/Glyph height: 16 |
| 12 | 0 | No compression/Interlacing 1 line |
| 14 | 00 | 0000 0000 |
| 16 | 00 | 0000 0000 |
| 18 | 00 | 0000 0000 |
| 20 | 00 | 0000 0000 |
| 22 | 00 | 0000 0000 |
| 24 | 00 | 0000 0000 |
| 26 | 00 | 0000 0000 |
| 28 | 00 | 0000 0000 |
| 30 | 00 | 0000 0000 |
| 32 | 00 | 0000 0000 |
| 34 | 00 | 0000 0000 |
| 36 | 00 | 0000 0000 |
| 38 | 00 | 0000 0000 |
| 40 | 00 | 0000 0000 |
| 42 | 00 | 0000 0000 |
| 44 | 00 | 0000 0000 |
| 48 | | CRC16 |

Glyph W

| Quartet number | Data | Comments |
| --- | --- | --- |
| 5 | DE105 | Multicast adress/Glyph index 105 |
| 6 | 2 | Glyph sending |
| 11 | 02008 | Glyph width: 8/Glyph height: 16 |
| 12 | 0 | No compression/Interlacing 1 line |
| 14 | 00 | 0000 0000 |
| 16 | 00 | 0000 0000 |
| 18 | 42 | 0100 0010 |
| 20 | 00 | 0100 0010 |
| 22 | 00 | 0100 0010 |
| 24 | 18 | 0101 1010 |
| 26 | 00 | 0101 1010 |
| 28 | 00 | 0101 1010 |
| 30 | 00 | 0101 1010 |
| 32 | 00 | 0101 1010 |
| 34 | 00 | 0101 1010 |
| 36 | 00 | 0101 1010 |
| 38 | 3C | 0110 0110 |
| 40 | 42 | 0010 0100 |
| 42 | 24 | 0000 0000 |
| 44 | 00 | 0000 0000 |
| 48 | | CRC16 |

Glyph R

| Quartet number | Data | Comments |
| --- | --- | --- |
| 5 | DE106 | Multicast adress/Glyph index 106 |
| 6 | 2 | Glyph sending |
| 11 | 02008 | Glyph width: 8/Glyph height: 16 |
| 12 | 0 | No compression/interlacing 1 line |
| 14 | 00 | 0000 0000 |
| 16 | 00 | 0000 0000 |
| 18 | 78 | 0111 1000 |
| 20 | 3C | 0100 0100 |
| 22 | 00 | 0100 0100 |
| 24 | 00 | 0100 0100 |
| 26 | 00 | 0100 0100 |
| 28 | 3A | 0111 1110 |
| 30 | 3C | 0100 0010 |
| 32 | 00 | 0100 0010 |
| 34 | 00 | 0100 0010 |
| 36 | 00 | 0100 0010 |
| 38 | 00 | 0100 0010 |
| 40 | 00 | 0100 0010 |
| 42 | 42 | 0000 0000 |
| 44 | 00 | 0000 0000 |
| 48 | | CRC16 |

Glyph D

| Quartet number | Data | Comments |
| --- | --- | --- |
| 5 | DE107 | Multicast adress/Glyph index 107 |
| 6 | 2 | Glyph sending |
| 11 | 02008 | Glyph width: 8/Glyph height: 16 |
| 12 | 0 | No compression/Interlacing 1 line |
| 14 | 00 | 0000 0000 |
| 16 | 00 | 0000 0000 |
| 18 | 78 | 0111 1000 |
| 20 | 3C | 0100 0100 |
| 22 | 06 | 0100 0010 |
| 24 | 00 | 0100 0010 |
| 26 | 00 | 0100 0010 |
| 28 | 00 | 0100 0010 |
| 30 | 00 | 0100 0010 |
| 32 | 00 | 0100 0010 |
| 34 | 00 | 0100 0010 |
| 36 | 00 | 0100 0010 |

-continued

| Quartet number | Data | Comments |
| --- | --- | --- |
| 38 | 06 | 0100 0100 |
| 40 | 3C | 0111 1000 |
| 42 | 78 | 0000 0000 |
| 44 | 00 | 0000 0000 |
| 48 |  | CRC16 |

With eight glyph, nearly 1.5 kbits have to be transferred. Finally, label are shut off for battery saving.

| Quartet number | Data | Comments |
| --- | --- | --- |
| 5 | DFFFF | Broadcast adress |
| 6 | F | Sleep |
| 7 | 0 | Padding |
| 8 |  | CRC4 |

Additional Data Compression

Advantageously, syntax of preamble may be further improved. Thus, in the "HELLO WORLD" example, each glyph index is coded by 4 bits in a preamble. Instead of using a constant-length code, it should be interesting to code some frequent glyphs with less than 4 bits. Algorithms enabling such data compression are known in the field of data coding under the name of "Huffman algorithms". The idea is to build a table or a tree sorted with respect to the estimated probability of occurrence for each possible character, and to affect variable-length codes for indexes: given a glyph, the highest is its occurrence frequency, the shortest is its code. This method has been proved as the most efficient.

If we apply a Huffman algorithm to the "HELLO WORLD" example, we can build this table:

| Glyph | Huffman code |
| --- | --- |
| H | 010 |
| E | 011 |
| L | 100 |
| O | 00 |
| W | 101 |
| R | 110 |
| D | 111 |

By using such compressed varible-length code instead of constant 4-bits code, only 16 quartets (20 quartets previously) would have to be transferred per preamble.

Furthermore, data volume may still more reduced by using data compression algorithm on the glyphs, such as bitmap compression algorithms known to the skilled person.

Server, Label, and System

According to other aspects, the invention proposes a server and an electronic label, both being adapted for implementing the method according to the first aspect of the invention.

To this, end, the server according to the second aspect of the invention comprises:
  a glyph unit configured for generating for each different character or symbol of a product information an individual glyph;
  a script generator unit configured for generating at least a display script comprising reference and position data of said glyphs in the product information to be displayed in at least one electronic label;
  a data emitting unit configured for transmitting the glyphs and the at least one display script to at least one electronic label.

The electronic label according to the third aspect of the invention comprises a graphic display (in other words a pixel array display, as already explained), a processing unit, a memory, a data reception unit, and is characterized in that:
  the data reception unit is configured to receive and load into the memory at least one display script comprising reference and position data of glyphs corresponding to the characters and symbols in a product information to be displayed;
  the data reception unit is further configured to receive a sequence of glyphs with their reference data;
  the processing unit is configured to determine, for each glyph if its reference data corresponds to one of the reference data loaded in the memory, and to select the glyph and load it into the memory if it is the case;
  the processing unit is further configured to order the displaying by the graphic display of the selected and loaded individual glyphs according to the position data of the display script.

The invention also proposes a system comprising in combination a server and at least one electronic label as previously described.

The invention claimed is:

1. A method for displaying product information on a plurality of electronic labels, each having a graphic display the method comprising the steps of:
  (a) generating, at a server connected to the plurality of electronic labels, an individual glyph corresponding to each different character or symbol of the product information;
  (b) generating at least one display script comprising reference and position data of said glyphs in the product information for at least a first electronic label and a second electronic label of the plurality of labels, the reference data of said glyphs being common to the at least first and second electronic labels;
  (c2) unicasting a preamble to the first electronic label, said preamble comprising reference data of glyphs which are not shared between the at least first and second electronic labels;
  (c) multicasting the display script to the at least first and second electronic labels the label;
  (d) broadcasting the individual glyphs to the plurality of electronic labels;
  (e) determining which of the individual glyphs correspond to one of the reference data comprised in the display script and the preamble, and then selecting and downloading for each of the plurality of electronic labels only the individual glyphs corresponding to the reference data comprised in the display script and the preamble; and
  (f) for each of the plurality of electronic labels, displaying the selected and downloaded individual glyphs according to the position data comprised in the display script.

2. The method according to claim 1, wherein the display script further comprises kerning data of the glyphs in the product information.

3. The method according to claim 1, wherein a plurality of display scripts is generated at step (b), each display script corresponding to a part of the product information.

4. The method according to claim 1, wherein a plurality of labels is simultaneously involved, each label displaying a specific product information.

5. The method according to claim 1, wherein each label of the plurality of electronic labels is in a standby mode except during steps (c) and (d).

6. The method according to claim 5, wherein step (c) is implemented following a previous step of (c1) broadcasting a wakeup message for ending standby mode; and wherein a step of (d2) broadcasting a sleep message for going into standby mode is implemented following step (d).

7. The method according to claim 6, wherein step (d) is implemented following a previous step of (d1) broadcasting a synchronization message.

8. The method according to claim 1, wherein reference data of glyphs are coded in the preambles according to a Huffman algorithm.

9. A plurality of electronic labels, each comprising:
a graphic display;
a memory;
wherein each of the electronic labels is configured to:
  receive and download into the memory:
    at least one multicasted display script comprising reference and position data of glyphs corresponding to the characters and symbols in a product information for at least a first electronic label and a second electronic label of the plurality of labels, the reference data of said glyphs being common to the at least first and second electronic labels; and
    receive a sequence of glyphs with their reference data and a unicasted preamble at the first electronic label, said preamble comprising reference data of glyphs which are not shared between the at least first and second electronic label; and
a processing unit configured to:
  determine, for each glyph, if its reference data corresponds to one of the reference data downloaded in the memory;
  select and download into the memory only the individual glyphs corresponding to the reference data comprised in the display script and the preamble; and
  order the displaying by the graphic display of the selected and downloaded individual glyphs according to the position data of the display script.

10. A system comprising:
a server comprising a processing unit configured to:
  generate, for each different character or symbol of a product information, an individual glyph;
  generate at least one display script comprising reference and position data of said glyphs in the product information for at least a first electronic label and a second electronic label of the plurality of labels, the reference data of said glyphs being common to the at least first and second electronic labels of a plurality of labels;
  multicasting the at least one display script to the first and second electronic labels;
  unicastinq a preamble to at least one of the first and second electronic labels, said preamble comprising reference data of glyphs which are not shared between the at least first and second electronic labels;
  broadcasting the glyphs to the plurality of electronic labels, and
each of the plurality of electronic labels comprising:
  a graphic display,
  a memory,
  wherein each electronic label is configured to:
    receive and download into the memory the at least one multicasted display script comprising reference and position data of glyphs corresponding to the characters and symbols in a product information and the unicasted preamble; and
    receive a sequence of glyphs with their reference data; and
  an another processing unit, wherein the another processing unit of each electronic label is configured to
    determine, for each glyph, if its reference data corresponds to one of the reference data downloaded in the memory;
    select and download into the memory only the individual glyphs corresponding to the reference data comprised in the multicasted display script and the unicasted preamble; and
    order the displaying by the graphic display of the selected and downloaded individual glyphs according to the position data of the multicasted display script.

\* \* \* \* \*